(12) United States Patent
Martin et al.

(10) Patent No.: US 11,354,917 B2
(45) Date of Patent: Jun. 7, 2022

(54) DETECTION OF FRAUDULENTLY GENERATED AND PHOTOCOPIED CREDENTIAL DOCUMENTS

(71) Applicant: Idemia Identity & Security USA LLC, Billerica, MA (US)

(72) Inventors: Brian K. Martin, McMurray, PA (US); Joseph R. Mayer, Passaic County, NJ (US); Alexandru Bogdan, New York, NY (US)

(73) Assignee: Idemia Identity & Security USA LLC, Billerica, MA (US)

( * ) Notice: Subject to any disclaimer, the term of this patent is extended or adjusted under 35 U.S.C. 154(b) by 133 days.

(21) Appl. No.: 16/922,800

(22) Filed: Jul. 7, 2020

(65) Prior Publication Data

US 2021/0019519 A1 Jan. 21, 2021

Related U.S. Application Data

(60) Provisional application No. 62/874,126, filed on Jul. 15, 2019.

(51) Int. Cl.
*G06V 20/80* (2022.01)
*G06T 7/11* (2017.01)
*G06T 7/40* (2017.01)
*G06T 7/194* (2017.01)
*G06K 9/62* (2022.01)
*G06V 20/00* (2022.01)

(52) U.S. Cl.
CPC ........... *G06V 20/80* (2022.01); *G06K 9/6256* (2013.01); *G06K 9/6262* (2013.01); *G06T 7/11* (2017.01); *G06T 7/194* (2017.01); *G06T 7/40* (2013.01); *G06V 20/95* (2022.01)

(58) Field of Classification Search
CPC .................................. G06V 20/80; G06T 7/40
See application file for complete search history.

(56) References Cited

U.S. PATENT DOCUMENTS

| 10,339,374 | B1 * | 7/2019 | Pribble | G06K 9/00456 |
| 2004/0247169 | A1 * | 12/2004 | Ross | G07D 7/206 |
| | | | | 382/137 |
| 2014/0072219 | A1 * | 3/2014 | Tian | G06K 9/346 |
| | | | | 382/171 |

(Continued)

*Primary Examiner* — Edward Park
(74) *Attorney, Agent, or Firm* — Robert Facey; Adam Lewental

(57) ABSTRACT

A method for detecting images of fraudulently generated or photocopied secure credential documents using texture analysis includes receiving, by one or more processors, an image of a secure credential document from a computer device. The one or more processors segment the image of the secure credential document into multiple regions. For each region of the multiple regions, the one or more processors extract local high-resolution texture features from the image of the secure credential document. The one or more processors generate a score based on the local high-resolution texture features using a machine learning model. The score is indicative of a likelihood that the image of the secure credential document is fraudulently generated or photocopied. The one or more processors transmit a message to a display device indicating that the image of the secure credential document is fraudulently generated or photocopied.

18 Claims, 9 Drawing Sheets

(56) References Cited

U.S. PATENT DOCUMENTS

| | | | | |
|---|---|---|---|---|
| 2017/0351914 | A1* | 12/2017 | Zavalishin | G06K 9/481 |
| 2018/0186167 | A1* | 7/2018 | Jones | B42D 25/305 |
| 2021/0019519 | A1* | 1/2021 | Martin | G06T 7/44 |
| 2021/0358032 | A1* | 11/2021 | Cella | G06Q 30/0201 |
| 2021/0390704 | A1* | 12/2021 | Fujimoto | G06T 7/11 |
| 2022/0000959 | A1* | 1/2022 | Levy | A61P 1/16 |

\* cited by examiner

DETECTION OF FRAUDULENTLY GENERATED AND PHOTOCOPIED CREDENTIAL DOCUMENTS

CROSS-REFERENCE TO RELATED APPLICATION

This application claims the benefit of U.S. Provisional Application 62/874,126, filed on Jul. 15, 2019, which is incorporated herein by reference in its entirety.

FIELD OF THE INVENTION

This description relates generally to security improvement for credential documents and specifically to a method and system for detecting images of fraudulently generated or photocopied secure credential documents using texture analysis.

BACKGROUND

The use of mobile devices such as cell phones and tablets can lead to rising rates of identity theft and fraud. Moreover, capturing samples of secure credentials to remotely authenticate identity poses challenges.

SUMMARY

A method and system for detecting images of fraudulently generated or photocopied secure credential documents using texture analysis is disclosed. One or more processors receive an image of a secure credential document from a computer device. The one or more processors segment the image of the secure credential document into multiple regions. For each region of the multiple regions, the one or more processors extract local high-resolution texture features from the image of the secure credential document. The one or more processors generate a score based on the local high-resolution texture features using a machine learning model. The score is indicative of a likelihood that the image of the secure credential document is fraudulently generated or photocopied. The one or more processors transmit a message to a display device indicating that the image of the secure credential document is fraudulently generated or photocopied.

In some embodiments, the one or more processors remove a background of the image of the secure credential document.

In some embodiments, the background of the image of the secure credential document includes at least one of a margin of the image of the secure credential document or texture information.

In some embodiments, the removing of the background of the image of the secure credential document includes cropping, by the one or more processors, the image of the secure credential document.

In some embodiments, the secure credential document includes at least one of a driver's license, an identity document, a passport, or a social security card.

In some embodiments, the multiple regions include a polygonal grid pattern.

In some embodiments, the one or more processors convert the image of the secure credential document into a grayscale image of the secure credential document.

In some embodiments, the local high-resolution texture features include local binary pattern (LBP) features.

In some embodiments, the one or more processors construct a histogram of the LBP features. The histogram is for the generating of the score using the machine learning model.

In some embodiments, the one or more processors reduce the LBP features to a Rotationally Invariant Uniform set to decrease a size of the histogram.

In some embodiments, the one or more processors normalize the histogram by at least one of subtracting a mean of the histogram, or dividing the histogram by a magnitude of the histogram.

In some embodiments, the one or more processors generate training sets from images of secure credential documents and fraudulently generated or photocopied images of the secure credential documents. The one or more processors extract training features from the training sets.

In some embodiments, the generating of the score based on the local high-resolution texture features includes detecting, by the one or more processors, texture artifacts from the local high-resolution texture features. The texture artifacts include at least one of noise or color pixilation.

In some embodiments, the image of the secure credential document is fraudulently generated by at least one of printing the secure credential document, or displaying the image of the secure credential document on a digital display of the computer device.

In some embodiments, the generating of the score based on the local high-resolution texture features includes detecting, by the one or more processors, texture artifacts including at least one of pixel patterns or subpixel patterns.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

The use of mobile devices such as cell phones and tablets can lead to identity theft and fraud. Moreover, the capturing of samples of secure credentials to remotely authenticate identity poses challenges. The embodiments disclosed herein address detecting fraudulently generated images or photocopied secure credential documents by texture analysis.

A method and system for detecting fraudulently printed or photocopied secure credential documents by texture analysis is disclosed. An image of a secure credential document is received from a computer device. One or more processors segment the image of the secure credential document into multiple regions. For each region of the multiple regions, the one or more processors extract local high-resolution texture features. In some embodiments, the local high-resolution texture features are local binary pattern (LBP) features. Where LBP features are used, the one or more processors construct a histogram of the local high-resolution texture features. In other embodiments, where other types of features are used, a histogram may not be generated. In some embodiments, the one or more processors normalize the histogram to generate a feature vector. A machine learning model is used to generate a score based on the features, where the score is indicative of a likelihood that the image is a fraudulently generated or photocopied image of the secure credential document.

Among other benefits and advantages of the embodiments disclosed herein, improved detection of fraudulently copied documents is achieved using a machine learning model. The disclosed embodiments enable greater accuracy on large test datasets, which contain images from multiple sources. The use of the derived feature vectors as the inputs for the machine learning enable more-accurate detection of fraudulently copied documents.

Figure 1:
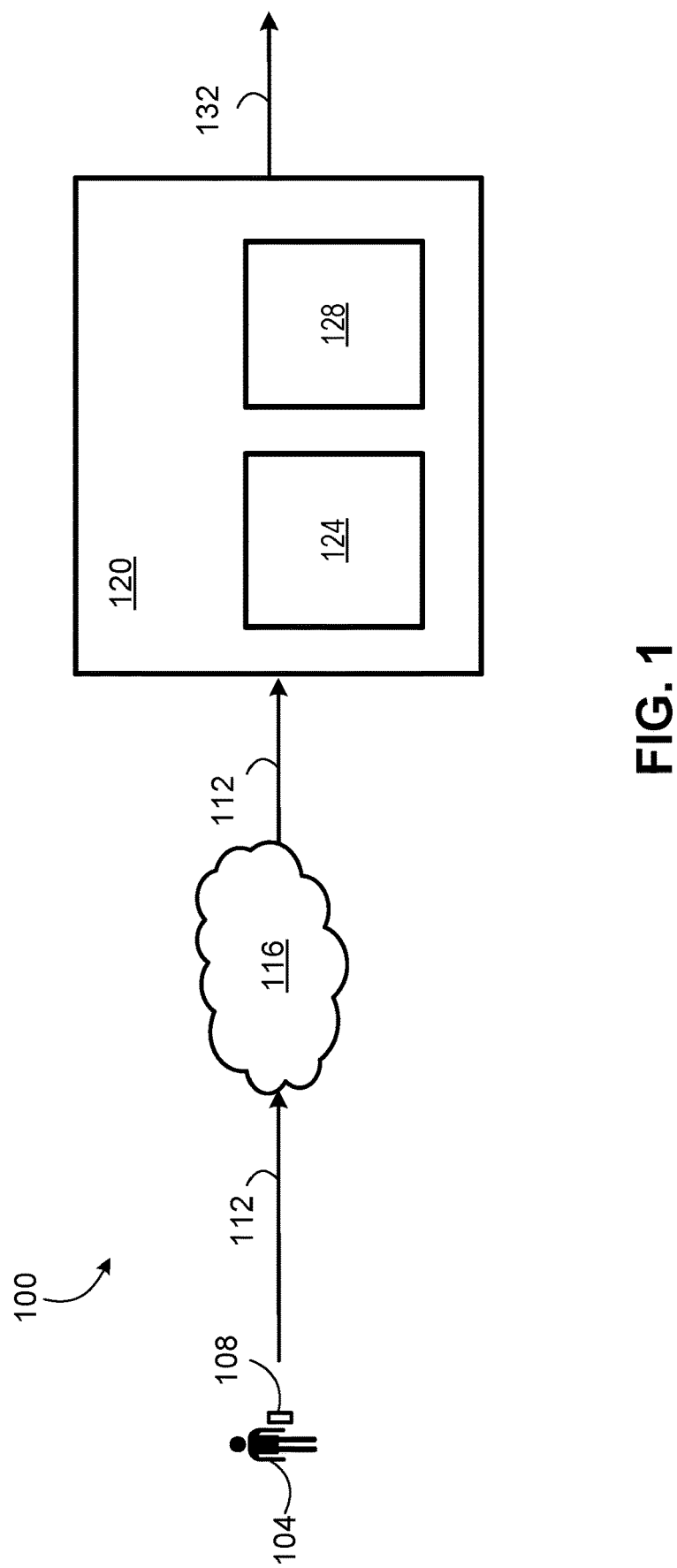
FIG. 1 illustrates a block diagram of an environment for detecting images of fraudulently generated or photocopied secure credential documents using texture analysis, in accordance with one or more embodiments.

FIG. 1 illustrates a block diagram of an environment 100 for detecting images of fraudulently generated or photocopied secure credential documents by texture analysis, in accordance with one or more embodiments. The environment 100 includes a user 104, a computer device 108, a network 116, and a fraudulent image detection system 120. In other embodiments, the environment 100 includes additional or fewer components than those described herein. Similarly, the functions can be distributed among the components or different entities in a different manner than is described here.

The user 104 is a human user, such as a customer or enrollee who is trying to enroll into an identity system or a document creation system, e.g., a department of motor vehicles (DMV). For example, the user 104 can be a person who is submitting a photograph (e.g., the image 112) of a document to law enforcement or a government agency. In some embodiments, the user 104 is an agent of an enrollee, e.g., a friend, a representative, or a guardian who is authorized to transmit the image 112 of the enrollee to the fraudulent image detection system 120. The computer device 108 can take the image 112 of a document or can be used to transmit the image 112. The computer device 108 can be a hand-held or personal digital device that includes a camera, e.g., a smartphone, a tablet, a PC, or a laptop. In some examples, the computer device 108 can be a digital camera or a desktop. The computer device 108 takes a photograph (e.g., the image 112) of a secure credential document of the user 104 and transmits the image 112 of the document to the fraudulent image detection system 120.

To verify the identity of the user 104, a mobile capture by the computer device 108 of a secure credential such as a driver's license, an identity document, a passport, or a social security card can be used. As part of the verification process, it can be desirable to detect whether the digital image 112 samples the original secure credential document or is an image of a duplicate or fraud made by a photocopier or a consumer printer. For example, the image 112 can be fraudulently generated by printing the secure credential document and then taking a photograph (e.g., the image 112) of the printed secure credential document. The image 112 can be fraudulently generated by displaying an image of the secure credential document on a liquid crystal display (LCD) screen or a digital display of the computer device 108 and then taking a photograph (e.g., the image 112) of the image displayed on the LCD screen or digital display of the computer device 108. Texture artifacts, such as anomalies or unintended effects, can occur in printed images, photocopied images, or images displayed on an LCD screen. The display on an electronic screen of a reproduced secure credential document does not indicate actual or physical possession of the original secure credential document and may be insufficient proof of identity. Such a photocopied or generated image 112 can be fabricated or modified. The embodiments disclosed herein use the identification of such artifacts, e.g., caused by resolution resampling (due to resizing image to fit the native resolution of the digital display) or compression artifacts, for detecting images of fraudulently generated or photocopied secure credential documents using texture analysis.

The network 116 connects the computer device 108 to the fraudulent image detection system 120. In some embodiments, the fraudulent image detection system 120 can be located on a computer that the user 104 can access locally. The network 116 can include networking resources (for example, networking equipment, nodes, routers, switches, and networking cables) that interconnect the computer device 108 to the fraudulent image detection system 120 and help facilitate access of the fraudulent image detection system 120 to data storage and cloud computing services. In some embodiments, the network 116 represents any combination of one or more local networks, wide area networks, or internetworks coupled by wired or wireless links deployed by terrestrial or satellite connections. Data exchanged over the network 116, is transferred by any number of network layer protocols, such as Internet Protocol (IP), Multiprotocol Label Switching (MPLS), Asynchronous Transfer Mode (ATM), Frame Relay, etc. Furthermore, in embodiments where the network 116 represents a combination of multiple sub-networks, different network layer protocols are used at each of the underlying sub-networks. In some embodiments, the network 116 represents one or more interconnected internetworks, such as the public Internet or a secure channel (e.g., a virtual private network (VPN)) from the fingerprint reader to the fraudulent image detection system 120.

The fraudulent image detection system 120 automatically detects images of fraudulently generated or photocopied secure credential documents by texture analysis and can notify the enrolling agency, department, or entity. The fraudulent image detection system 120 includes a feature extraction module 124 and a machine learning model 128. In other embodiments, the fraudulent image detection system 120 includes additional or fewer components than those described herein. Similarly, the functions can be distributed among the components or different entities in a different manner than is described here.

The feature extraction module 124 preprocesses the image 112 and can extract a feature vector from the image 112. An example feature vector 204 is illustrated and described in more detail with reference to FIG. 2. The numerical label "204" is used to interchangeably refer to both "features" and a "feature vector" herein. The feature extraction module 124 can be implemented in hardware or software. For example, the feature extraction module 124 can be implemented as hardware circuitry or software code that is incorporated into a computing system such as a server system (e.g., a cloud-based server system), a desktop or laptop computer, or a mobile device (e.g., a tablet computer or smartphone). In some embodiments, the feature extraction module 124 applies dimensionality reduction (e.g., via linear discriminant analysis or principle component analysis) to reduce the amount of data of the feature vector 204 to a smaller, more representative set of data.

The machine learning model 128 is used to generate a score 132 indicative of a likelihood that the image 112 is a fraudulently generated or photocopied secure credential document. The machine learning model 128 can be implemented as software code that is incorporated into a computing system such as a server system (e.g., a cloud-based server system), a desktop or laptop computer, or a mobile device (e.g., a tablet computer or smartphone). The machine learning model 128 is trained using training sets as illustrated and described in detail below with reference to FIG. 2.

The embodiments disclosed herein use texture analysis to determine if the digital image 112 contains a sample of a photocopied or consumer-printed document as opposed to a legitimate original document. Texture artifacts can arise due to characteristics of the paper used or noise introduced by a printer or a photocopier during reproduction. Display of a document on an LCD or other digital display can also introduce associated characteristic artifacts as illustrated and described in more detail below with reference to FIG. 5. Texture artifacts refer to the undesired or unintended alterations in the image data introduced by photocopying or printing the original secure credential document or representation on a digital display. The texture artifacts will not necessarily be obvious to the eye in practice.

The machine learning model 128 is trained for use in the classification process. A set of known original document samples and a set of known duplicate documents are used. As a first step, for each sample the document can be isolated from the background to exclude complications from random background textures in the image 112. In some embodiments, the image 112 is converted to grayscale and segmented into regions. The regions can include a simple grid pattern of rectangles or a more strategic pattern to exploit known document characteristics. For each region, local high-resolution texture features are extracted. Example features 204 are illustrated and described in more detail with reference to FIG. 2. In some embodiments, the local high-resolution texture features 204 are local binary pattern (LBP) features.

In some embodiments, the detection of fraudulently generated or photocopied secure credential documents using texture analysis is performed across color channels. The color digital image 112 includes pixels made of combinations of primary colors represented by a series of code. A color channel in this context is an image of the same size as a color image, made of only one of these primary colors. For example, an image from a standard digital camera can have red, green and blue channels. In some embodiments, the image 112 can be in the YCbCr color space. Y refers to a luma component while Cb and Cr refer to the blue-difference and red-difference chroma components. In such embodiments, correcting for color balance or white balance can be performed. The color balance refers to the global adjustment of the intensities of the colors (typically red, green, and blue primary colors). The method of rendering specific colors, e.g., neutral colors, correctly is sometimes referred to as gray balance, neutral balance, or white balance.

Where LBP features are used, a histogram of the extracted features 204 is constructed. In other embodiments, where other feature types are used, no histogram may be created. LBP features are a visual descriptor used for classification in computer vision, for example, in a texture spectrum model or texture classification. Where LBP features are used, the LBP can be reduced to a Rotationally Invariant Uniform set to decrease the size of the histogram for speed reasons and to increase robustness to changes in image sample orientation. In other embodiments, the features 204 are not reduced. The local high-resolution texture features 204 have rotational invariance if the values of the local high-resolution texture features 204 do not change when arbitrary rotations are applied to the argument of the local high-resolution texture features 204.

In some embodiments, a different histogram can be generated for each region. In such embodiments, the histogram for each region is normalized by subtracting its mean and dividing by its magnitude. During machine learning model training, the individual normalized local high-resolution texture features 204 can be used directly or the contributions from all the regions from a given image 112 can be averaged and the average then normalized and used instead. Two groups of feature sets are thus available, one from the legitimate document samples and one from duplicate/fraudulent samples. Machine learning is employed to construct a classifier to distinguish the samples from the two groups. Linear Discriminant Analysis techniques can be used to provide the basis for classifying the local high-resolution texture features 204. The machine learning model 128 resulting from the machine learning process is used in the evaluation of future incoming samples.

To classify a newly acquired image 112, the image 112 undergoes the same preprocessing as described above. That is, the image 112 is segmented. In some embodiments, the image 112 is converted to grayscale. The image 112 is segmented into multiple regions. For each region, local high-resolution texture features 204 are extracted. Where LBP features are used, a normalized histogram feature set is created. In other embodiments where other feature types are used, no histogram may be created. For each region's features 204, the machine-learning model 128 constructed above is applied to produce a classification or class score. Evaluation of the overall document sample's class can be deduced from a number of simple or complex approaches. Depending on the acceptable False-Positive and False-Negative rates for a given application, averaging the classification of all regions or taking the minimum or maximum class vote among the regions can be performed. Alternatively, a more complex technique such as another machine learning model trained on the individual regional class votes from the document can be used. Evaluation of texture signatures on a region-wise basis can offer increased sensitivity to the fact that certain artifacts can be more apparent on different types of image content. Noise from dust or paper texture may only be detectable on light colored patches. Certain color pixilation may only show on darker patches.

Figure 2:
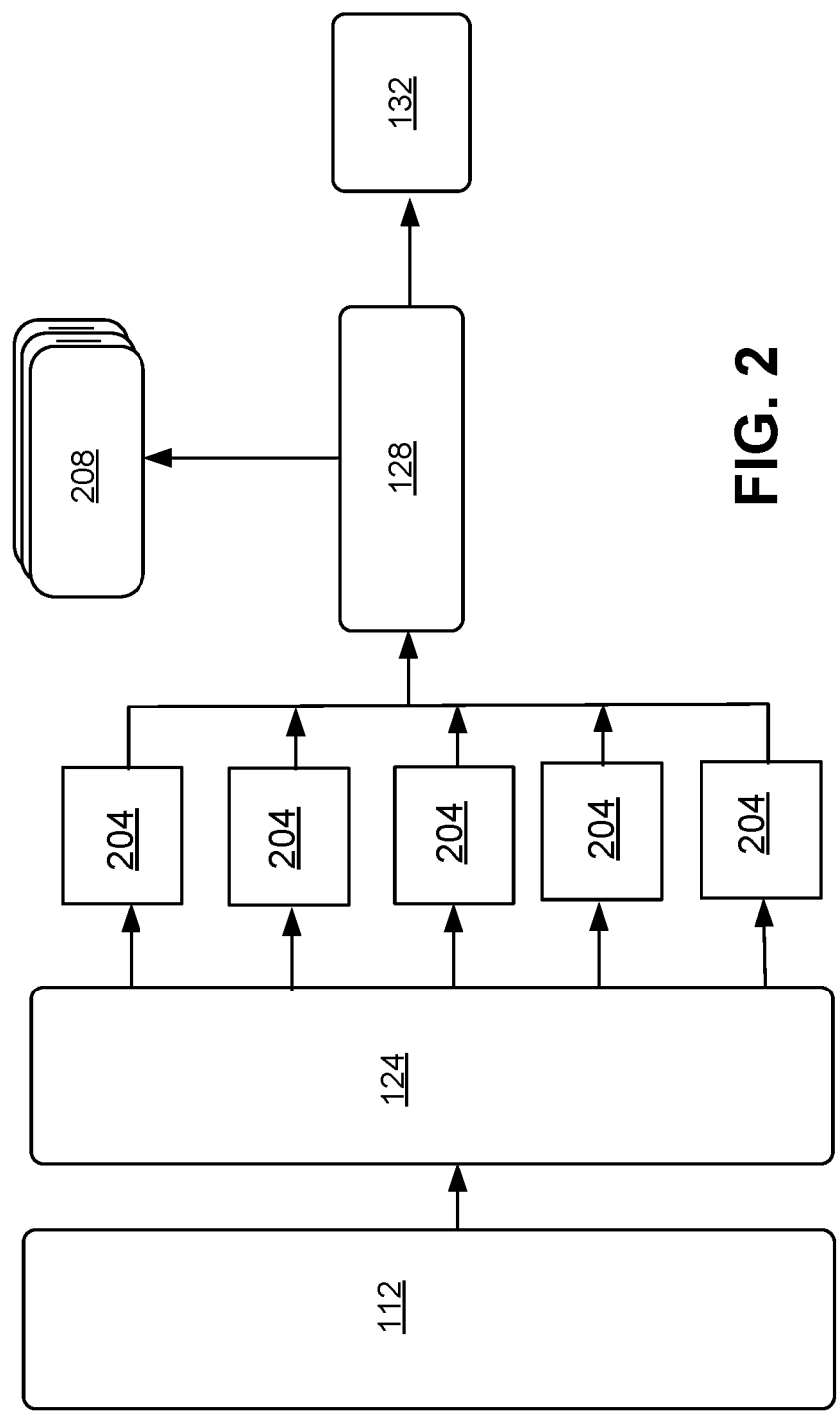
FIG. 2 illustrates an example process for training and operation of a machine learning model for detecting images of fraudulently generated or photocopied secure credential documents by texture analysis, in accordance with one or more embodiments.

FIG. 2 illustrates an example process for training and operation of a machine learning model 128 for detecting images of fraudulently generated or photocopied secure credential documents by texture analysis, in accordance with one or more embodiments. For example, an image can be fraudulently generated by at least one of printing a secure credential document or displaying the image of the secure credential document on an LCD screen or a digital display of the computer device 108.

The feature extraction module 124 receives, from the computer device 108, an image 112 of a secure credential document. In some embodiments, the image 112 of the secure credential document is converted into a grayscale image of the secure credential document. The feature extraction module 124 segments, by one or more processors, the image 112 of the secure credential document into multiple regions, as illustrated in more detail below with reference to FIG. 8. In some embodiments, the multiple regions include a polygonal grid pattern. For each region of the multiple regions, the feature extraction module 124 extracts, by the one or more processors, local high-resolution texture features 204, e.g., LBP features. LBP is a visual descriptor used for classification in computer vision. In some embodiments, local high-resolution texture feature extraction is combined with the histogram of oriented gradients (HOG) descriptors. This combination improves the detection performance.

In some embodiments, the feature extraction module 124 constructs, by the one or more processors, a histogram of the local high-resolution texture features 204. In some embodiments, the local high-resolution texture features 204 are reduced to a Rotationally Invariant Uniform set to decrease a size of the histogram. In some embodiments, the feature extraction module 124 normalizes, by the one or more processors, the histogram for each region to generate a regional feature vector. For example, the image 112 is divided into regions (e.g., 16×16 pixels for each region). For each pixel in a region, the pixel is compared to each of its 8 neighbors. Where the center pixel's value is greater than the neighbor's value, a binary value of "0" is generated. Else, a value of "1" is generated. An 8-digit binary number is thus formed. A histogram is generated over a region for the frequency of each "value" occurring. The histogram is a 256-dimensional feature vector. The histogram can be normalized. In some embodiments, the normalizing of the histogram includes subtracting a mean of the histogram. In other embodiments, the normalizing of the histogram includes dividing the histogram by a magnitude of the histogram. In some embodiments, the histograms of multiple regions are concatenated, generating the feature vector 204. The feature vector 204 is then processed by the support vector machine (SVM), extreme learning, or another machine learning algorithm to classify images. In some embodiments, the feature extraction module 124 constructs a histogram of LBP features. The histogram is applied as feature vector input to the machine learning model 128.

The machine learning model 128 is used to generate a score 132 based on the feature vector 204. The score is indicative of a likelihood that the image 112 is a fraudulently generated or photocopied image of the secure credential document. In some embodiments, the generating of the score 132 based on the feature vector 204 includes detecting, by the one or more processors, texture artifacts including noise from dust. In other embodiments, the generating of the score 132 based on the feature vector 204 includes detecting, by the one or more processors, texture artifacts including color pixilation. Pixel pattern or subpixel pattern artifacts within images captured from a digital display may be another source of artifacts represented in the feature vector 204, e.g., as illustrated and described in more detail below with reference to FIG. 5. The score 132 can be compared to a threshold value. For example, the threshold value can lie between 0.7 and 0.9. If the score 132 is higher than the threshold value, the image 112 is transmitted for further investigation to an output display device, such as a computer monitor at a government agency or an entity performing the enrolling process for the user 104. If the score 132 is higher than the threshold value, the one or more processors transmit a message to a display device indicating that the image 112 of the secure credential document is fraudulently generated or photocopied.

In some embodiments, one or more processors generate training sets 208 from training images of secure credential documents and fraudulently generated or photocopied images of the secure credential documents. The feature extraction module 124 extracts training features from the training images. Machine learning techniques are used to train the machine learning model 128, that when applied to the training features, outputs indications of whether a training image has an associated property or properties. For example, when applied to training features of training images, the machine learning model 128 can be used to estimate whether the training images are from a photocopied driver's license. In some embodiments, training sets 208 are generated from legitimate images of secure credential documents and fraudulently generated or photocopied images of the secure credential documents. Local high-resolution texture features for training can be extracted from multiple regions of the training images. In some embodiments, the local high-resolution texture features are averaged across the multiple regions of the training sets. In other embodiments, the averaged local high-resolution texture features are normalized.

In an embodiment, supervised machine learning is used to train the machine learning model 128 with the feature vectors of a positive training set and a negative training set serving as the inputs. In other embodiments, different machine learning techniques, such as CNN, GAN, deep learning, neural networks, linear support vector machine (linear SVM), boosting for other algorithms (e.g., AdaBoost), logistic regression, naïve Bayes, memory-based learning, random forests, bagged trees, decision trees, boosted trees, or boosted stumps, can be used.

In some example embodiments, a validation set is formed of additional feature, other than those in the training data, which have already been determined to have or to lack the property in question. The trained machine learning model 128 is applied to the features of the validation set to quantify the accuracy of the machine learning model 128. Common metrics applied in accuracy measurement include: True Positive Rate=True Positives/(True Positives+False Negatives), and False Positive Rate=False Positives/(False Positives+True Negatives), where True Positives refers to the number of fraudulent images the machine learning model 128 correctly detected out of the total images the machine learning model 128 evaluated, and False Positives refers to the number of non-fraudulent images the machine learning model 128 falsely detected out of the total number of images the machine learning model 128 evaluated. A receiver operating characteristic curve is created by plotting the True Positive Rate against the False Positive Rate at various threshold settings. In one embodiment, the machine learning model 128 is iteratively re-trained until the occurrence of a stopping condition, such as an accuracy measurement indication that the machine learning model 128 is sufficiently accurate, or a number of training rounds have taken place.

In some embodiments, a convolutional neural network (CNN) with deep learning is used for classification. For example, a CNN can be used to learn and evaluate salient features of fraudulently copied documents directly from raw images. Full images can be used to directly train a deep CNN for detecting fraudulently copied documents. The CNN can automatically learn good feature representations from the raw image. The deep learning approach has benefits and advantages over traditional classifiers for fraudulently copied document detection. For example, a deep CNN can handle larger dimensional middle features. The CNN does not need to craft any features for training. In addition, a deep CNN is less sensitive to trap into a local minimum for raw data.

In some embodiments, several datasets, such as for training, validation, and test are created to build the machine learning model 128. The training dataset 208 is used for training. The validation dataset is used for validation during the training to determine whether the model in the training converges to a similar performance or not. In some embodiments where computation power is constrained, the training is applied to single-type derived images instead of multiple-type images. For example, training can be performed by each derived image independently to obtain multiple machine learning models for each derived image. A score fusion of the machine learning models is performed to obtain an optimal fused score. In some embodiments, training is applied to a simpler network such as Alexnet to achieve better accuracy then a deeper network.

Figure 3:
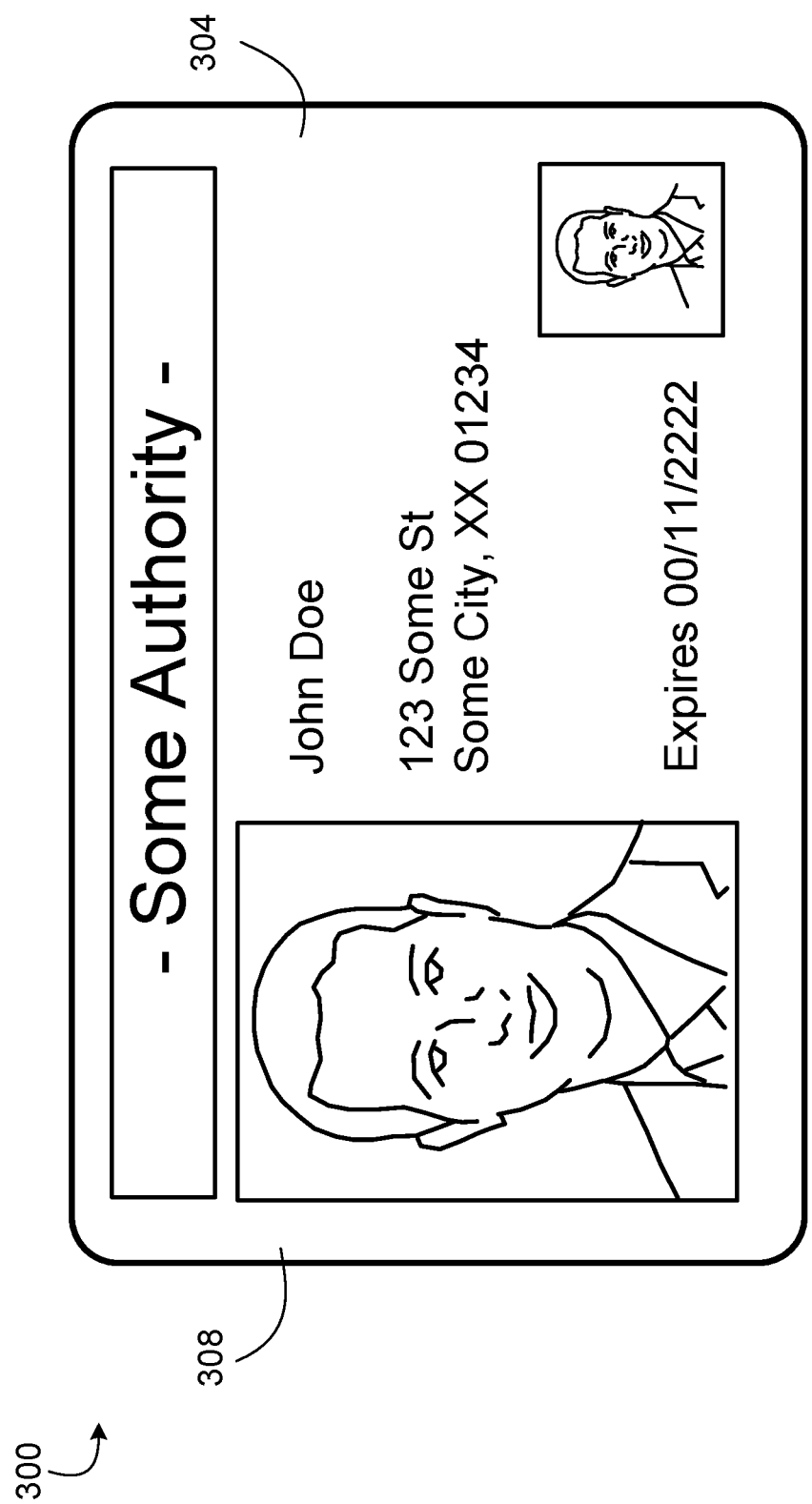
FIG. 3 illustrates an example of a fraudulently generated image of a secure credential document, in accordance with one or more embodiments.

FIG. 3 illustrates an example of a fraudulently generated image 300 of a secure credential document, in accordance with one or more embodiments. Texture artifacts 304 and image blurring 308, as a result of the image capture or the printer, are visible in the image 300. The local high-resolution texture features 204 extracted from the texture artifacts 304 and the image blurring 308 of the image 300 can be used by the machine learning model 128 to detect the fraudulent use.

Figure 4:
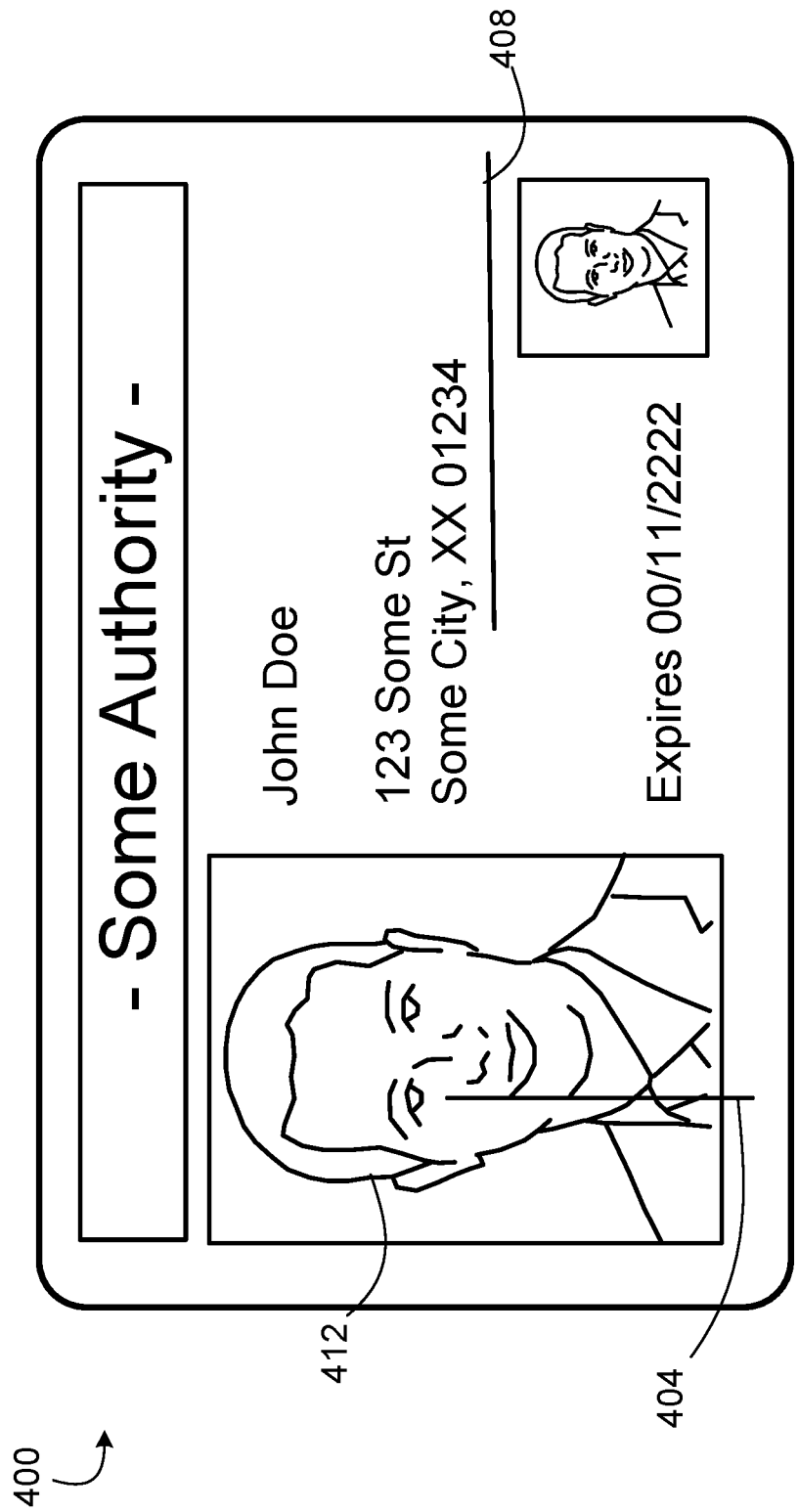
FIG. 4 illustrates an example image of a photocopied secure credential document, in accordance with one or more embodiments.

FIG. 4 illustrates an example image 400 of a photocopied secure credential document, in accordance with one or more embodiments. Texture artifacts 404 of the image 400 can be used by the machine learning model 128 to detect the fraudulent use. Photocopying or generating of a secure credential document can introduce several kinds of texture artifacts, such as horizontal or vertical lines 404, 408, striping, compression noise, or blemishes 412.

Figure 5:
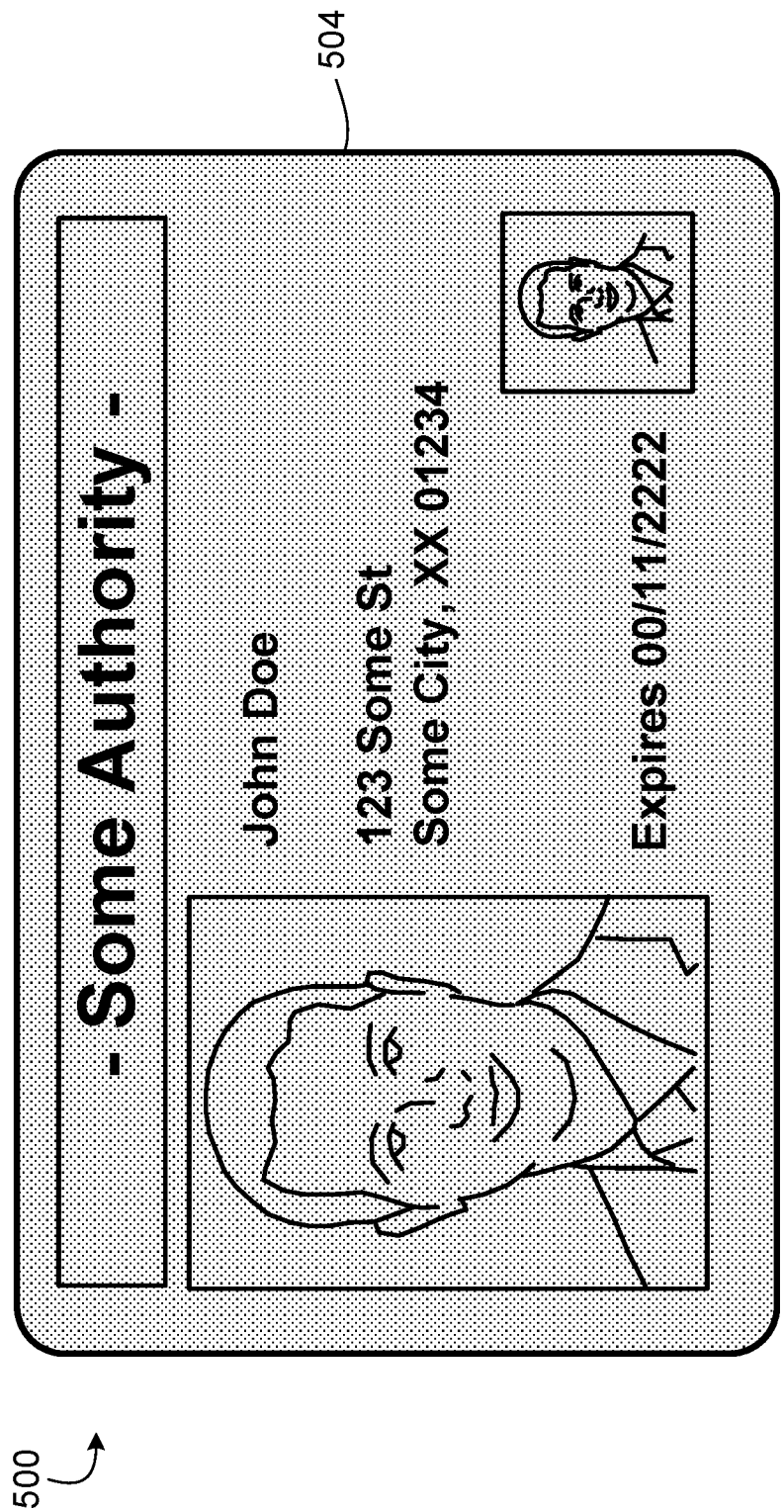
FIG. 5 illustrates an example image having artifacts associated with display on a liquid crystal display (LCD) screen, in accordance with one or more embodiments.

FIG. 5 illustrates an example image 500 having artifacts 504 associated with display on a liquid crystal display (LCD) screen, in accordance with one or more embodiments. Texture artifacts, such as anomalies or unintended effects, can occur in the image 500 when displayed on an LCD screen. Texture artifacts such as pixel or subpixel patterns can be used by the machine learning model 128 to detect fraudulent use. For example, the artifacts 504 cause an exaggerated checkerboard pattern to form on the image 500. The embodiments disclosed herein identify such artifacts that can be caused by resolution resampling (due to resizing image to fit the native resolution of the digital display) or image data compression.

Figure 6:
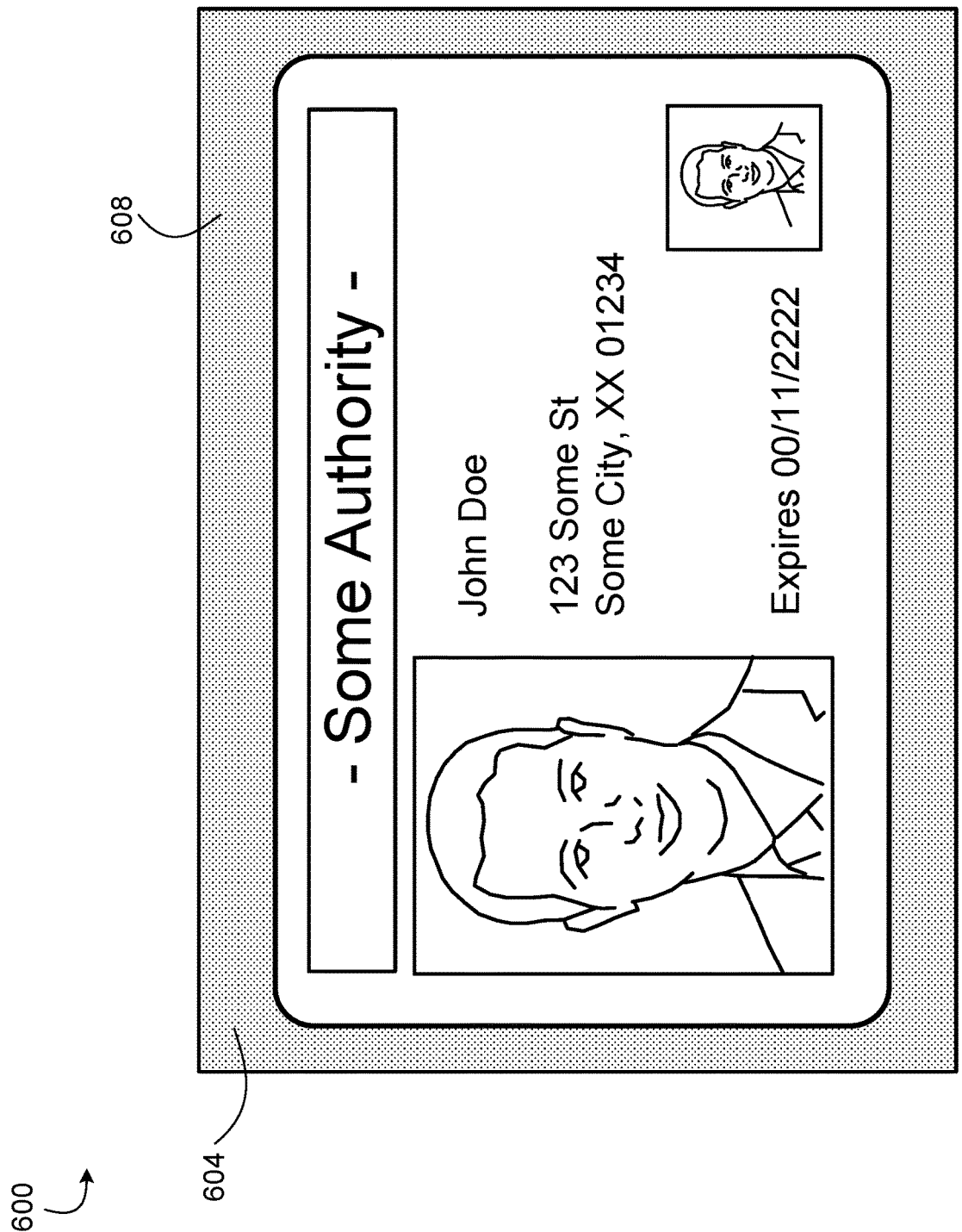
FIG. 6 illustrates an example image of a secure credential document, in accordance with one or more embodiments.

FIG. 6 illustrates an example image 600 of a secure credential document, in accordance with one or more embodiments. The image has a background area 604 that includes a margin of the image. In some embodiments, the background of the image includes arbitrary texture information 608.

Figure 7:
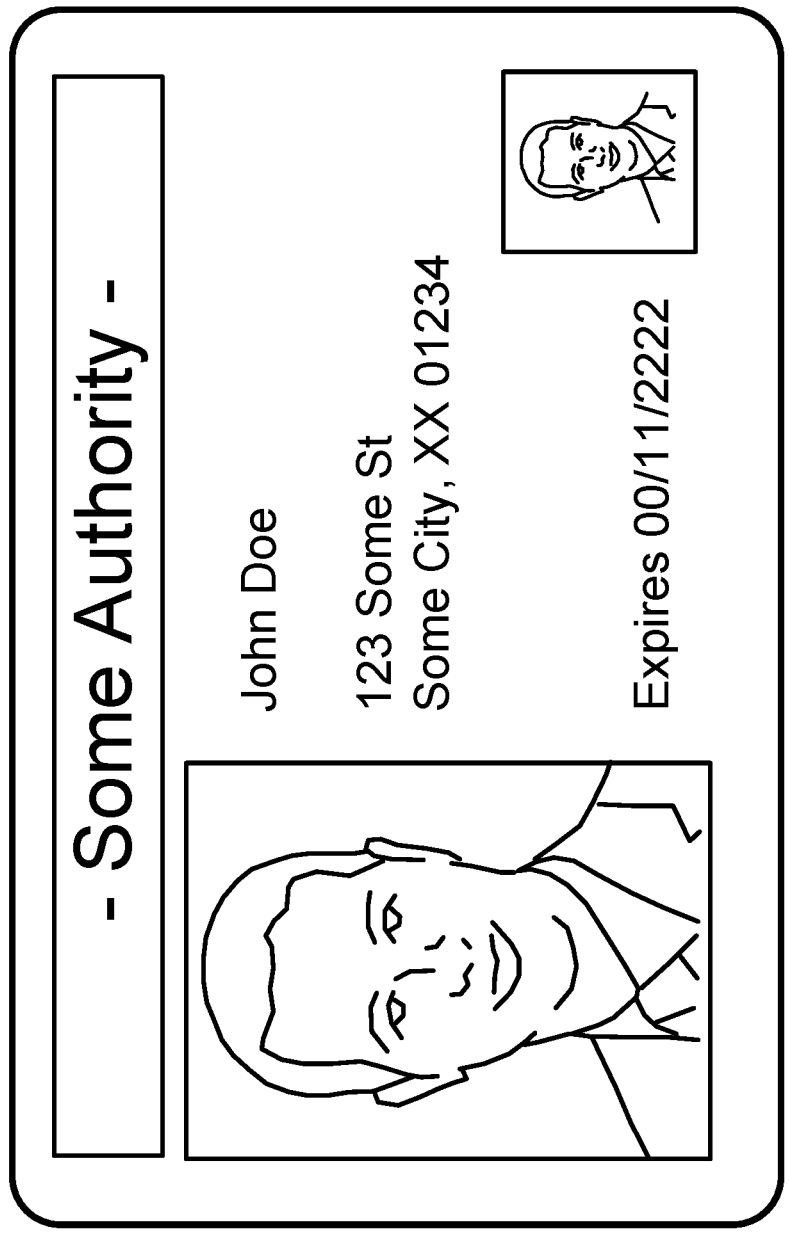
FIG. 7 illustrates an example cropped image of a secure credential document, in accordance with one or more embodiments.

FIG. 7 illustrates an example cropped image 700 of a secure credential document, in accordance with one or more embodiments. The image 700 is a cropped version of the image 600 illustrated with reference to FIG. 6. The feature extraction module 124 receives, from the computer device 108, the image 600 of a secure credential document. The feature extraction module 124 removes, by one or more processors, the background 604 of the image 600 of the secure credential document to generate the cropped image 700 of the secure credential document. In some embodiments, the removing of the background 604 of the image 600 includes cropping or cutting the image as illustrated in FIG. 7. Edge detection or boundary analysis can be performed for removing the background 604 of the image 600 of the secure credential document to generate the image 700.

Figure 8:
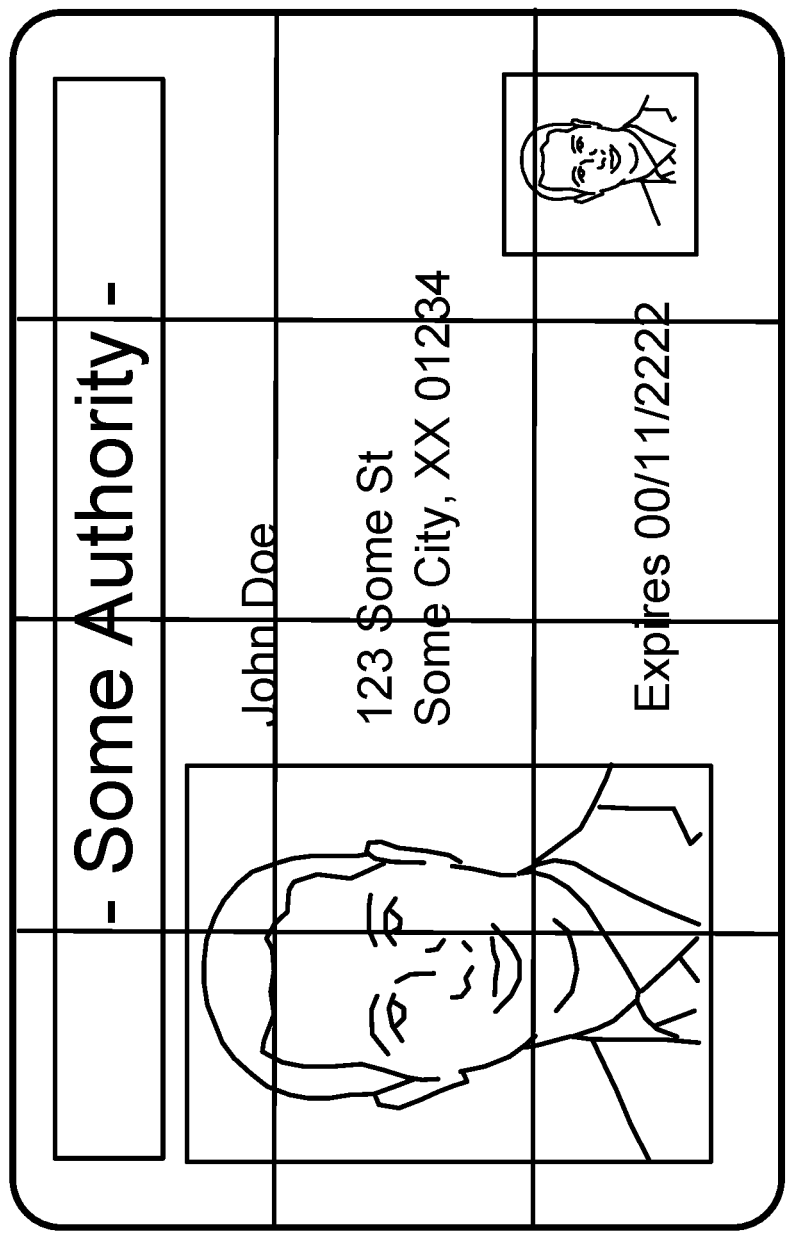
FIG. 8 illustrates an example segmented image of a secure credential document, in accordance with one or more embodiments.

FIG. 8 illustrates an example segmented image of a secure credential document, in accordance with one or more embodiments. The feature extraction module 124 receives, from the computer device 108, an image 112 of a secure credential document. The feature extraction module 124 segments, by one or more processors, the image 112 of the secure credential document into multiple regions as illustrated in FIG. 8.

Figure 9:
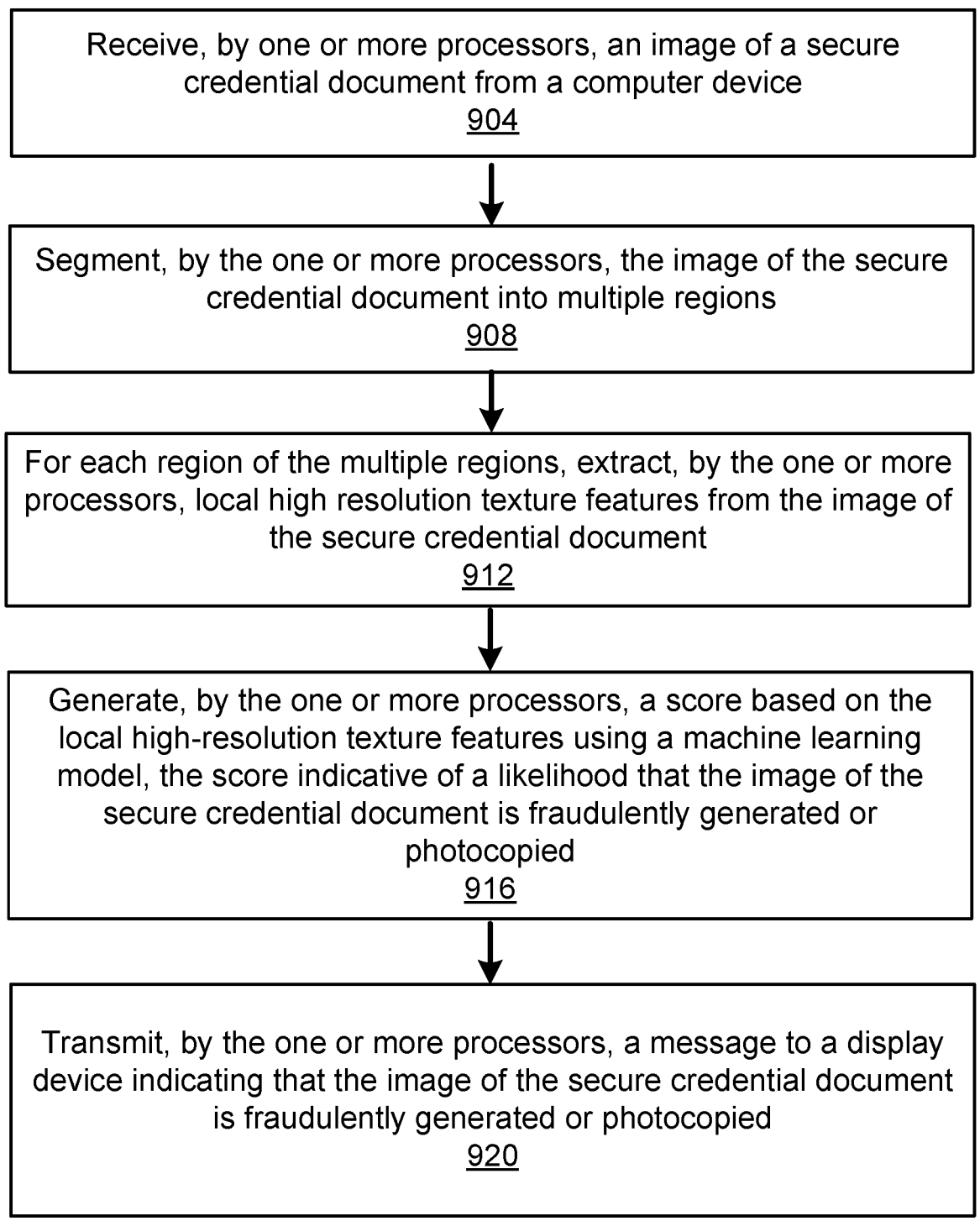
FIG. 9 illustrates a process for detecting fraudulently generated images or photocopied secure credential documents by texture analysis, in accordance with one or more embodiments.

FIG. 9 illustrates a process for detecting images of fraudulently generated or photocopied secure credential documents by texture analysis, in accordance with one or more embodiments. In some embodiments, the process of FIG. 9 is performed by the fraudulent image detection system 120. Other entities, for example, one or more components of a computing system perform some or all of the steps of the process in other embodiments. Likewise, embodiments can include different or additional steps, or perform the steps in different orders.

The fraudulent image detection system 120 receives 904 an image 112 of a secure credential document from a computer device 108. The computer device 108 can take the image 112 of a document or can be used to transmit the image 112. The computer device 108 can be a hand-held or personal digital device that includes a camera, e.g., a smartphone, a tablet, a PC, a laptop. In some examples, the computer device 108 can be a digital camera or a desktop. The computer device 108 takes a photograph of a secure credential document of the user 104 and transmits the image 112 of the document to the fraudulent image detection system 120.

The fraudulent image detection system 120 segments 908 the image 112 of the secure credential document into multiple regions. The regions can include a simple grid pattern of rectangles or a more strategic pattern to exploit known document characteristics. An example pattern of multiple regions is illustrated and described in more detail with reference to FIG. 8.

For each region of the multiple regions, the fraudulent image detection system 120 extracts 912 local high-resolution texture features, e.g., LBP features, from the image 112 of the secure credential document. LBP features are a visual descriptor used for classification in computer vision, for example, in a texture spectrum model or texture classification. Where LBP features are used, the LBP features can be reduced to a Rotationally Invariant Uniform set, for example, to increase robustness. The local high-resolution texture features have rotational invariance if the values of the local high-resolution texture features do not change when arbitrary rotations are applied to the argument of the local high-resolution texture features. Where LBP features are used, the fraudulent image detection system 120 can construct a histogram of the local high-resolution texture features to provide a feature vector 204. For example, a histogram can be generated for each region based on a frequency of each "value" occurring. The histogram can thus represent a 256-dimensional feature vector.

The fraudulent image detection system 120 generates 916 a score 132 based on the local high-resolution texture features using a machine learning model 128. The score 132 is indicative of a likelihood that the image 112 is fraudulently generated or a photocopied secure credential document. In some embodiments, the generating of the score 132 includes detecting, by the one or more processors, texture artifacts including noise from dust. In other embodiments, the generating of the score 132 includes detecting, by the one or more processors, texture artifacts including color pixilation. In other embodiments, the generating of the score 132 includes detecting, by the one or more processors, pixel or subpixel patterns associated with pictures captured from a digital display.

The fraudulent image detection system 120 transmits 920 a message to a display device indicating that the image of the secure credential document is fraudulently generated or a photocopied secure credential document. The display device can be a cathode ray tube (CRT), a liquid crystal display (LCD) monitor, or a light-emitting diode (LED) or organic light-emitting diode (OLED) monitor for displaying information to a user.

Various implementations of devices, systems, and techniques described herein can be realized in digital electronic modules, integrated modules, specially designed ASICs (application specific integrated modules), computer hardware, firmware, software, or combinations thereof. These various implementations can include implementation in one or more computer programs that are executable or interpretable on a programmable system including at least one programmable processor, which can be special or general purpose, coupled to receive data and instructions from, and to transmit data and instructions to, a storage system, at least one input device, and at least one output device.

Implementations can involve computer programs (also known as programs, software, software applications or code) include machine instructions for a programmable processor, and can be implemented in a high-level procedural or object-oriented programming language, or in assembly or machine language. As used herein, the terms "machine-readable medium" "computer-readable medium" refers to any computer program product, apparatus or device (e.g., magnetic discs, optical disks, memory, programmable logic devices (PLDs)) used to provide machine instructions or data to a programmable processor, including a machine-readable medium that receives machine instructions as a machine-readable signal. The term "machine-readable signal" refers to any signal used to provide machine instructions or data to a programmable processor.

Suitable computer processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated modules).

To provide for interaction with a user, the systems and techniques described here can be implemented on a computer having a display device (e.g., a CRT or an LCD, LED or OLED monitor for displaying information to the user) and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN", a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method comprising:
   receiving, by one or more processors, an image of a secure credential document from a computer device;
   segmenting, by the one or more processors, the image of the secure credential document into a plurality of regions;
   for each region of the plurality of regions, extracting, by the one or more processors, local high-resolution texture features from the image of the secure credential document, the local high-resolution texture features comprising local binary pattern (LBP) features;
   constructing, by the one or more processors, a histogram of the LBP features;

applying, by the one or more processors, the histogram as feature vector input to a machine learning model;

generating, by the one or more processors, a score based on the local high-resolution texture features using the machine learning model, the score indicative of a likelihood that the image of the secure credential document is fraudulently generated or photocopied; and transmitting, by the one or more processors, a message to a display device indicating that the image of the secure credential document is fraudulently generated or photocopied.

2. The method of claim 1, further comprising removing, by the one or more processors, a background of the image of the secure credential document.

3. The method of claim 2, wherein the background of the image of the secure credential document comprises at least one of a margin of the image of the secure credential document or texture information.

4. The method of claim 2, wherein the removing of the background of the image of the secure credential document comprises cropping, by the one or more processors, the image of the secure credential document.

5. The method of claim 1, wherein the secure credential document comprises at least one of a driver's license, an identity document, a passport, or a social security card.

6. The method of claim 1, wherein the plurality of regions comprises a polygonal grid pattern.

7. The method of claim 1, further comprising converting, by the one or more processors, the image of the secure credential document into a grayscale image of the secure credential document.

8. The method of claim 7, further comprising reducing, by the one or more processors, the LBP features to a Rotationally Invariant Uniform set to decrease a size of the histogram.

9. The method of claim 7, further comprising normalizing, by the one or more processors, the histogram by at least one of:
subtracting a mean of the histogram; or
dividing the histogram by a magnitude of the histogram.

10. The method of claim 1, further comprising:
generating, by the one or more processors, training sets from images of secure credential documents and fraudulently generated or photocopied images of the secure credential documents; and
extracting, by the one or more processors, training features from the training sets.

11. The method of claim 1, wherein the generating of the score based on the local high-resolution texture features comprises detecting, by the one or more processors, texture artifacts from the local high-resolution texture features, the texture artifacts comprising at least one of noise or color pixilation.

12. The method of claim 1, wherein the generating of the score based on the local high-resolution texture features comprises detecting, by the one or more processors, texture artifacts comprising at least one of pixel patterns or subpixel patterns.

13. A system comprising:
one or more computer processors; and
one or more computer-readable non-transitory storage media storing instructions which, when executed by the one or more computer processors, cause the one or more computer processors to:
receive an image of a secure credential document from a computer device;
segment the image of the secure credential document into a plurality of regions;
for each region of the plurality of regions, extract local high-resolution texture features from the image of the secure credential document, the local high-resolution texture features comprising local binary pattern (LBP) features;
construct a histogram of the LBP features;
apply the histogram as feature vector input to a machine learning model;
generate a score based on the local high-resolution texture features using the machine learning model, the score indicative of a likelihood that the image of the secure credential document is fraudulently generated or photocopied; and
transmit a message to a display device indicating that the image of the secure credential document is fraudulently generated or photocopied.

14. The system of claim 13, wherein the instructions, when executed by the one or more computer processors, cause the one or more computer processors to remove a background of the image of the secure credential document.

15. The system of claim 13, wherein the background of the image of the secure credential document comprises at least one of a margin of the image of the secure credential document or texture information.

16. One or more computer-readable non-transitory storage media storing instructions which, when executed by one or more computing devices, cause the one or more computing devices to:
receive an image of a secure credential document from a computer device;
segment the image of the secure credential document into a plurality of regions;
for each region of the plurality of regions, extract local high-resolution texture features from the image of the secure credential document, the local high-resolution texture features comprising local binary pattern (LBP) features;
construct a histogram of the LBP features;
apply the histogram as feature vector input to a machine learning model;
generate a score based on the local high-resolution texture features using the machine learning model, the score indicative of a likelihood that the image of the secure credential document is fraudulently generated or photocopied; and
transmit a message to a display device indicating that the image of the secure credential document is fraudulently generated or photocopied.

17. The computer-readable non-transitory storage media of claim 16, wherein the instructions, when executed by the one or more computing devices, cause the one or more computing devices to remove a background of the image of the secure credential document.

18. The computer-readable non-transitory storage media of claim 17, wherein the background of the image of the secure credential document comprises at least one of a margin of the image of the secure credential document or texture information.

* * * * *